United States Patent [19]

Stamm

[11] Patent Number: 4,575,684

[45] Date of Patent: Mar. 11, 1986

[54] DIFFERENTIAL PHASE SHIFT KEYING RECEIVER

[75] Inventor: Thomas A. Stamm, Chicago, Ill.

[73] Assignee: Honeywell Inc., Minneapolis, Minn.

[21] Appl. No.: 704,433

[22] Filed: Feb. 22, 1985

[51] Int. Cl.$^4$ .................................................. H03D 3/18
[52] U.S. Cl. ...................................... 329/122; 329/50; 329/124; 375/84
[58] Field of Search .................. 329/50, 122, 124; 375/81, 83, 84, 94, 120

[56] References Cited

U.S. PATENT DOCUMENTS

| | | | |
|---|---|---|---|
| 3,401,339 | 9/1968 | Kluever et al. | 325/30 |
| 3,479,598 | 11/1969 | Weller | 325/321 |
| 3,551,814 | 12/1970 | McCormick et al. | 325/38 |
| 3,739,277 | 6/1973 | Schneider et al. | 375/30 |
| 3,746,995 | 7/1973 | Schroeder et al. | 325/320 |
| 3,938,052 | 2/1976 | Glasson et al. | 329/104 |
| 3,982,195 | 9/1976 | Turner | 329/50 |
| 3,997,847 | 12/1976 | Tong | 329/105 |
| 4,233,565 | 11/1980 | Chmura | 329/50 |
| 4,246,654 | 1/1981 | Malm | 375/82 |
| 4,302,845 | 11/1981 | McClaughry et al. | 375/82 |
| 4,330,863 | 5/1982 | Wright | 375/81 |
| 4,387,342 | 6/1983 | Grosjean | 329/50 |

*Primary Examiner*—Eugene R. LaRoche
*Assistant Examiner*—James C. Lee
*Attorney, Agent, or Firm*—Trevor B. Joike

[57] ABSTRACT

A receiver for demodulating differential phase shift keying data, the data having bit values dependent upon whether the phase of a carrier is inverted or not inverted during a bit interval, the receiver having a phase locked loop oscillator for locking up with the phase of the carrier, a phase detector for sensing differences in phases between the oscillator signal and the incoming data, an oscillator controller for controlling the output phase of the oscillator in response to the phase detector, a phase sense detector which detects whether or not the carrier has been inverted, a data clock responsive to the oscillator and to the phase sense detector for providing a data clock signal defining a bit interval, and a bit detector responsive to the phase sense detector, the data clock and the oscillator for integrating the incoming data.

31 Claims, 16 Drawing Figures

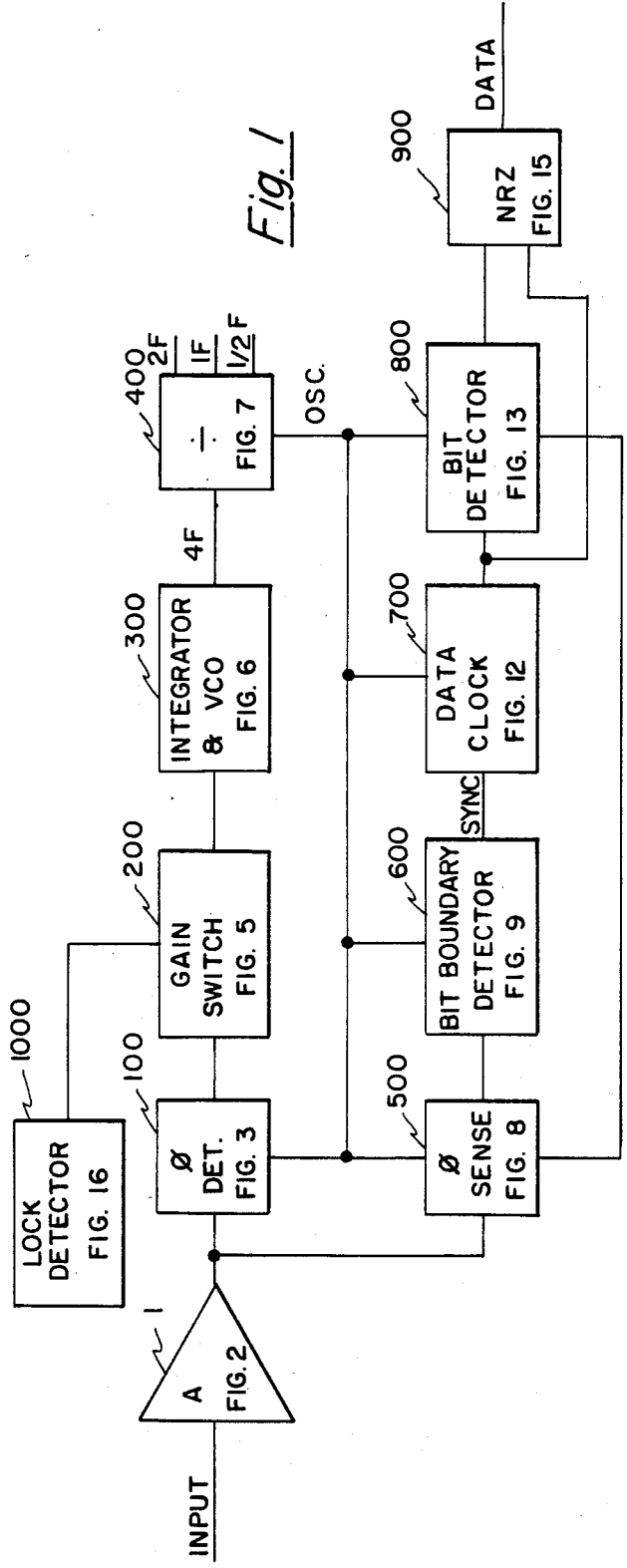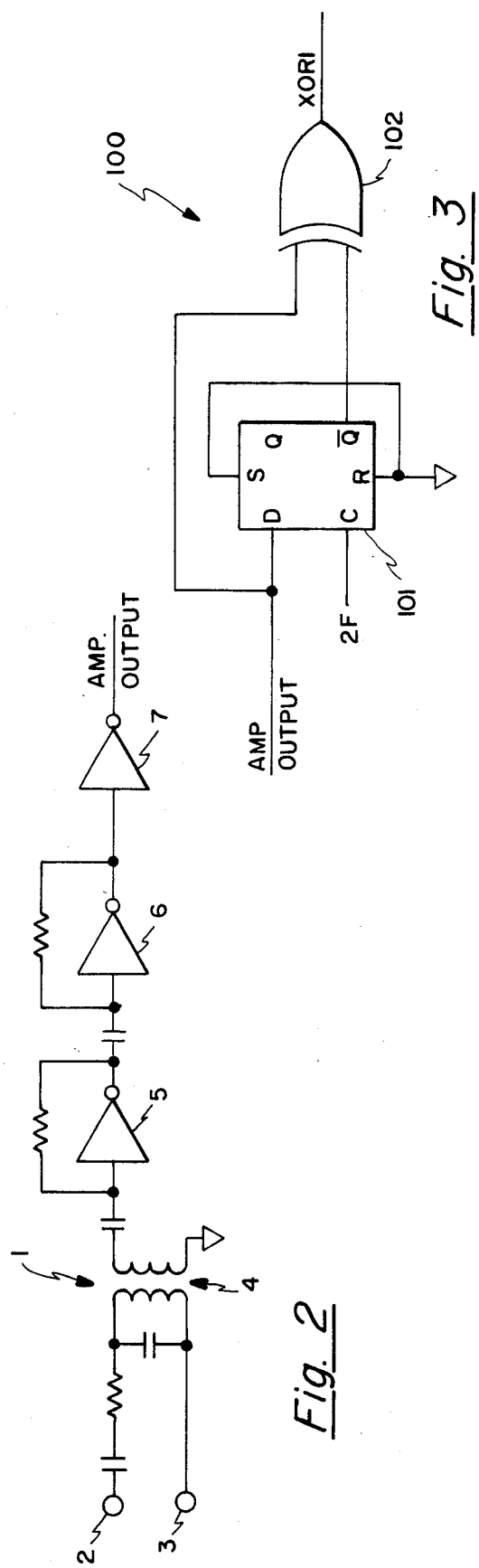

DIFFERENTIAL PHASE SHIFT KEYING RECEIVER

BACKGROUND OF THE INVENTION

The present invention relates to a receiver for receiving differential phase shift keying data and, more particularly, to such a receiver that can be used in a noisy environment such as power line carrier applications.

Data is transferred between two points in a data communication system in a variety of ways. In some cases the baseband signal itself is applied directly to the communication channel without the aid of a carrier signal. In other cases, a carrier signal is used. When a carrier signal is used, data is impressed on the communication channel in an assortment of ways such as modulating the amplitude of the carrier wave, modulating the frequency of the carrier wave or modulating the phase of the carrier wave. Phase modulation of the carrier wave has been increasing in popularity particularly in power line carrier applications.

The use of such receivers in applications such as power line carrier requires the receiver to reject prodigious amounts of noise. The receiver should also be designed so that it can be integrated to thus reduce the cost of its fabrication. Prior art receivers principally rely upon analog components which make integrated fabrication more difficult if not impractical.

SUMMARY OF THE INVENTION

The receiver according to the present invention efficiently rejects noise and can be readily integrated. This receiver demodulates differential phase shift keying data wherein the data has bit values dependent upon whether the phase of a carrier signal is inverted or not inverted during a bit interval. This receiver includes an input circuit for receiving differential phase shift keying data, an oscillator for supplying an oscillator signal, a phase detector connected to the input circuit and to the oscillator for providing a phase detection output signal dependent upon the difference in phase between the oscillator signal and the differential phase shift keying data, an oscillator controller connected to the phase detector and to the oscillator for controlling the phase of the oscillator signal in response to the phase detection output signal, a phase sense detector connected to the input circuit and to the oscillator for providing a phase sense output signal dependent upon the phase relationship between the differential phase shift keying data and the oscillator, a data clock connected to the oscillator and to the phase sense detector for providing a data clock signal defining a bit interval, and a bit detector connected to the phase sense detector, to the data clock and to the oscillator for providing demodulated output data bits dependent upon the differential phase shift keying data.

BRIEF DESCRIPTION OF THE DRAWINGS

These and other features and advantages will become more apparent from a detailed consideration of the drawings in which:

FIG. 1 shows a block diagram of the receiver according to the present invention;
FIG. 2 shows in more detail the amplifier of FIG. 1;
FIG. 3 shows in more detail the phase detector of FIG. 1.

DETAILED DESCRIPTION

Figure 4:
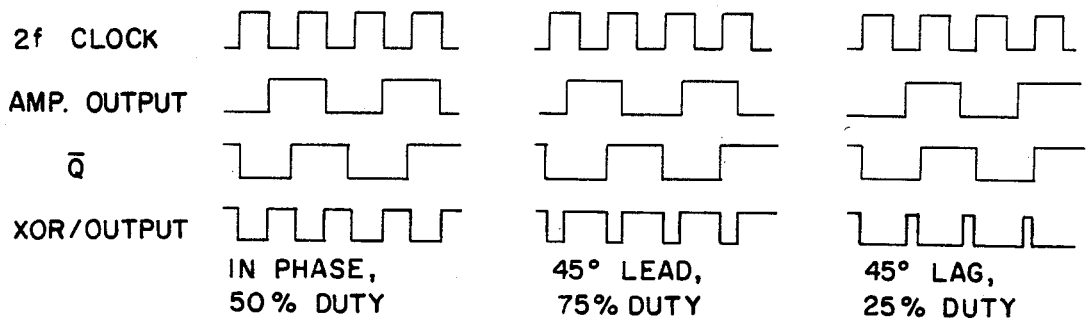
FIG. 4 shows a timing diagram for the phase detector of FIG. 3.

In FIG. 1, incoming data is supplied to the INPUT and then to amplifier 1 which amplifies the incoming signal with enough gain to produce a logic level output. This logic level output from amplifier 1 is connected to phase detector 100 which compares the phase of the incoming signal with the phase from the oscillator signal produced by the voltage controlled oscillator. Phase detector 100 produces an output which is dependent upon the difference in phase between the two signals. In the specific embodiment disclosed herein, the output signal from phase detector 100 has a duty cycle which is dependent upon the difference in phase between the incoming signal and the voltage controlled oscillator signal.

The output from phase detector 100 is supplied through analog switch 200 which is responsive to lock detector 1000. If the carrier signal is missing or if the receiver is in an out-of-lock condition for a predetermined amount of time, gain switch 200 is closed to shorten the loop time constant to give rapid acquisition of the signal. When the receiver loop is in lock, however, switch 200 is open making the time constant very long in order to reduce the loop's susceptibility to noise.

The output from switch 200 is supplied to integrator and voltage controlled oscillator 300 which integrates the duty cycle and supplies a voltage to the input of the voltage controlled oscillator as a function of the duty cycle. The output from the voltage controlled oscillator supplies a divider circuit for providing the various frequencies needed to operate the receiver shown in FIG. 1. Thus, phase detector 100 and integrator and VCO 300 provide a phase locked loop the gain of which is controlled by gain switch 200.

The output from amplifier 1 is also supplied to phase sense detector 500 which provides a digital output signal having a value dependent upon whether the input carrier is in or out of phase with the voltage controlled oscillator derived clock signal.

Bit boundary detector 600 responds to the output from the phase sense detector 500 and to the signal from the voltage controlled oscillator for determining the boundaries of the bit intervals which define the beginning and the end of a bit. The bit boundary detector provides a sync signal which is used to periodically resync the data clock to the incoming signal. Data clock 700 provides output pulses at the middle and at the end of each bit interval. Bit detector 800 responds to the voltage controlled oscillator signal, the pulses from data clock 700 and the phase sense detector signal for extracting the bits from the incoming differential phase shift keying data. This bit detector is essentially a digital integrator which will integrate each data bit so that noise can be more effectively rejected. The data bits which are produced by bit detector 800 are converted to nonreturn-to-zero (NRZ) bits by circuit 900 and supplied to the output data terminal.

FIG. 2 shows amplifier 1 of FIG. 1 in more detail. Amplifier 1 comprises input terminals 2 and 3 for connection to the transmission medium which may, for example, be power lines in a power line carrier application. This incoming data signal is connected through isolation transformer 4 to a three stage AC amplifier comprising inverters 5, 6 and 7. These inverters are provided with enough gain to saturate the last stage, i.e. inverter 7, thus producing a logic-level signal. The output from this last stage of amplification is connected to the corresponding input of phase detector 100 shown in more detail in FIG. 3.

Phase detector 100 includes D flip-flop 101 having its D terminal connected to the output of amplifier 1, its set and reset terminals grounded and its clock terminal connected to an output of divider circuit 400 which output produces an output frequency which is two times the carrier frequency. The $\overline{Q}$ output from D flip-flop 101 is connected to one input of EXCLUSIVE OR 102 the other input of which is connected directly to the output of amplifier 1.

This arrangement provides a phase detector which is insensitive to signal polarity but which produces an output duty cycle which is proportional to phase within 180° limits. The timing diagram for phase detector 100 is shown in FIG. 4. The 2F clock signal is applied to the clock terminal of D flip-flop 101 and the amplifier output signal is applied to the D terminal. As can be seen from FIG. 4, the EXCLUSIVE OR produces a signal which has a duty cycle proportional to the difference in phase between the signal appearing at the $\overline{Q}$ output of D flip-flop 101 and the phase of the output from amplifier 1. When these two signals are in phase, the EXCLUSIVE OR output has a 50% duty cycle. In the case where the oscillator signal leads the incoming data by 45°, a phase detector signal is produced which has a 75% duty cycle. In the case where the oscillator signal lags the incoming data signal by 45°, a phase detector signal is produced which has a 25% duty cycle.

Figure 5:
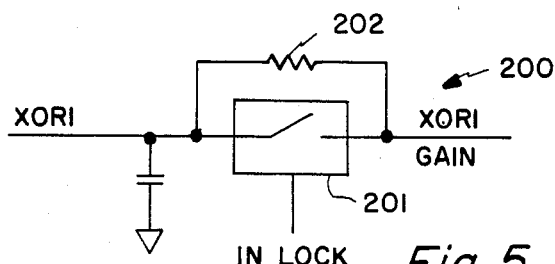
FIG. 5 shows the gain switch of FIG. 1.

The output from phase detector 100 is supplied to the input of gain switch 200 shown in more detail in FIG. 5. This switch includes analog switch 201 which responds to the in-lock signal for producing a very long time constant when the phase locked loop is in an in-lock condition. In this event, switch 201 is open and resistor 202 is connected between the input of gain switch 200 and its output. In the case where the phase locked loop is out of lock for a predetermined amount of time, switch 201 closes to shorten the time constant by shorting resistor 202.

Figure 6:
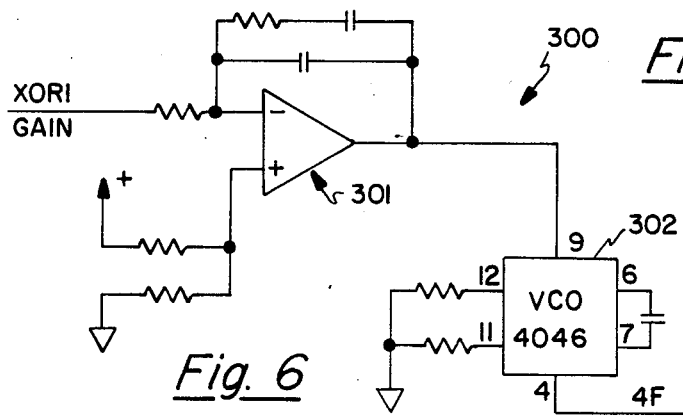
FIG. 6 shows the integrator and voltage controlled oscillator of FIG. 1.

The output from gain switch 200 is connected to the input of the integrator and voltage controlled oscillator 300 shown in more detail in FIG. 6. Accordingly, the phase detector output is integrated by integrator 301 to produce an output voltage which has a value proportional to the duty cycle of the phase detector output signal. This voltage is applied to the voltage control terminal of the voltage controlled oscillator 302 which produces an output frequency four times the frequency of the carrier signal.

Figure 7:
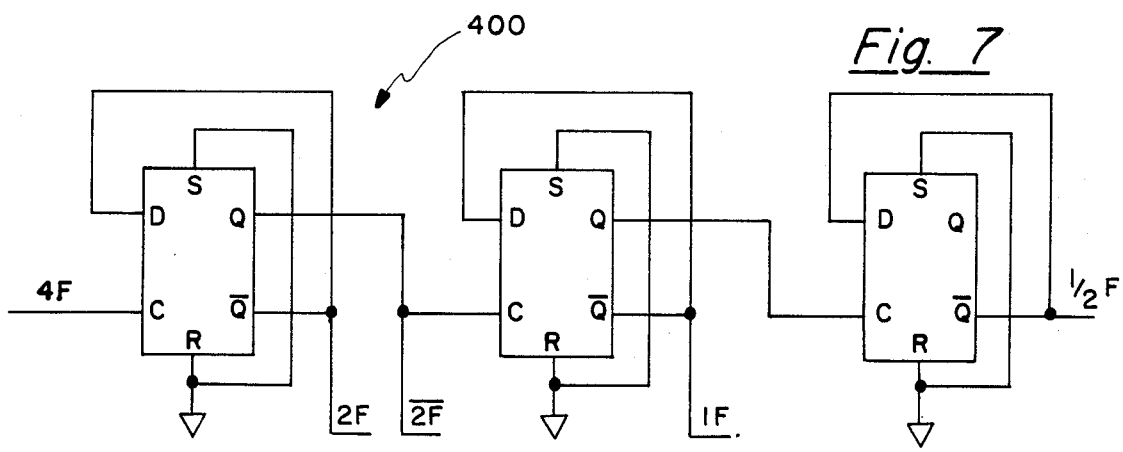
FIG. 7 shows the divider circuit of FIG. 1.

The output signal from the voltage controlled oscillator is connected as an input to frequency divider 400 shown in FIG. 7. This frequency divider which consists of three D flip-flops, divides the 4F signal down into 2F, 1F and ½F signals for use by the receiver.

As can be seen, phase detector 100, gain switch 200, integrator and voltage controlled oscillator 300 and divider 400 form a phase locked loop for locking onto the phase of the incoming differential phase shift keying data. The phase detector as disclosed herein will lock up to either the normal carrier phase or the inverted carrier without a transient when the inversion occurs.

Figure 8:
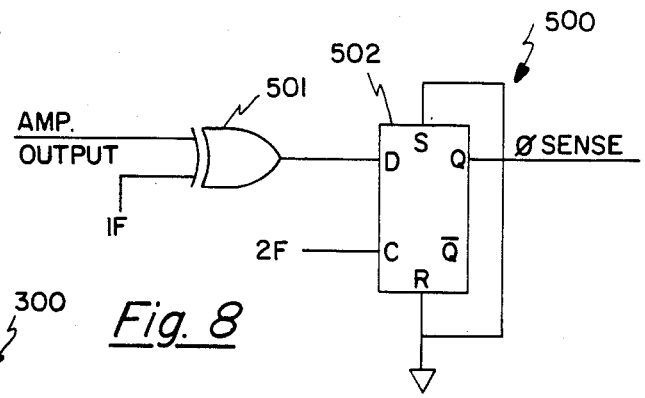
FIG. 8 shows the phase sense detector of FIG. 1.

The output from amplifier 1 is also connected to the input of the phase sense detector 500 shown in more detail in FIG. 8. Specifically, EXCLUSIVE OR 501 combines both the output from amplifier 1 and the 1F oscillator signal as an input to the D terminal of D flip-flop 502. D flip-flop 502 is clocked by the 2F signal to provide a phase sense output signal from the Q terminal of D flip-flop 502.

Figure 10:
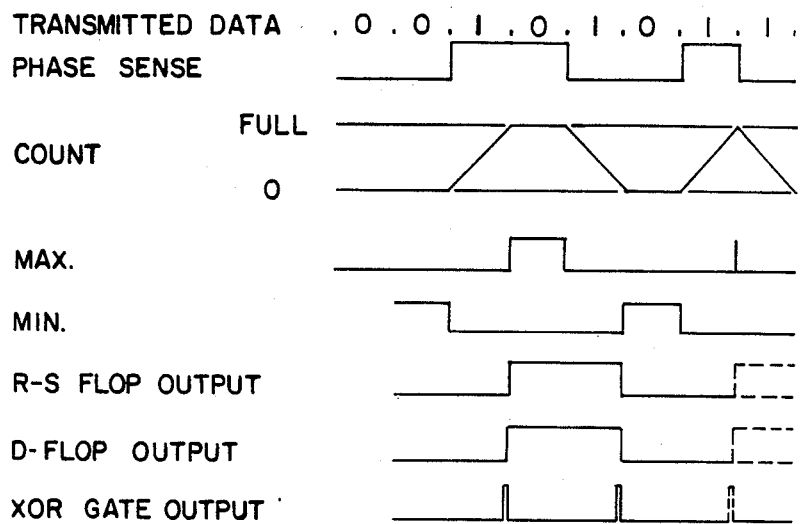
FIG. 10 shows the timing diagram associated with the bit boundary detector of FIG. 9.

As shown in FIG. 10, the phase sense output signal depends upon the phase of the incoming data signal. In the differential phase shift keying arrangement of the present invention, a logic 1 is transmitted by inverting the carrier for one bit time and a logic 0 is transmitted by not inverting the carrier for one bit time. Accordingly, if a 0 bit is transmitted, the carrier signal is not inverted so that the amplifier output and the 1F clock signal will match resulting in a logic level 0 output from EXCLUSIVE OR 501. The 0 at the D input of flip-flop 502 is clocked by the 2F input and results in a 0 output on the Q terminal of D flip-flop 502. In the example shown, the first 1 bit results from an inversion of the carrier frequency so that the inputs to the EXCLUSIVE OR 501 no longer match to produce a 1 input to the D terminal of D flip-flop 502. This 1 is clocked through to the output Q by the 2F clock signal. Since the carrier is not inverted back again for the subsequent 0 bit, a mismatch will continue to exist at the inputs to EXCLUSIVE OR 501 producing a logic level 1 at its output which is clocked through the Q output. The next 1 bit, however, will result in an inverted carrier again which will cause the phase of the amplifier output signal and the 1F clock signal to again match for producing a logic level 0 at the output of EXCLUSIVE OR 501. This logic level 0 is clocked through the the Q output of D flip-flop 502. FIG. 10 shows additional bits and how the phase detector reacts to provide its output signal.

Figure 9:
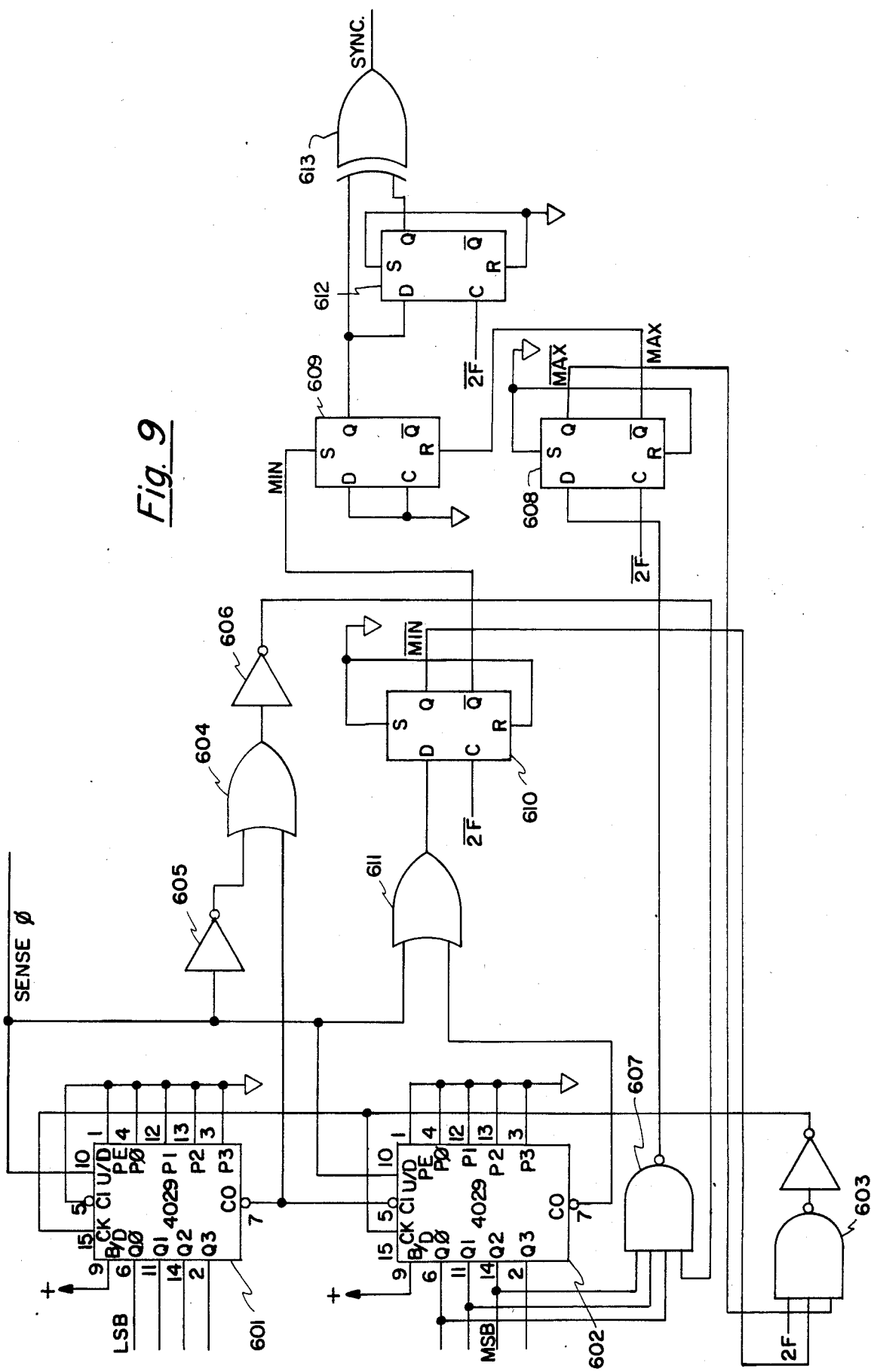
FIG. 9 shows the bit boundary detector of FIG. 1.

The output from phase sense detector 500 is connected as an input to the bit boundary detector 600 shown in more detail in FIG. 9. The phase sense circuit is applied to the U/D terminals of counters 601 and 602 of bit boundary detector 600. Bit boundary detector 600 provides a pulse at the end of each bit time if the bit edge can be identified from the incoming signal. This pulse is used to resynchronize the data clock as described hereinafter.

The phase sense signal controls the direction in which counters 601 and 602 count the 2F clock. The 2F clock is supplied through NAND gate 603 as long as counter 601-602 has not reached its minimum 0 count or its maximum count. Counter 601 is connected to count each of the 2F pulses and counter 602 is connected to count 2F pulses when counter 601 is full. Thus, counter 601-602 will sample the phase sense signal twice per carrier cycle, counting up if the signals are in phase and down if the signals are out of phase. The output of counter 601 which enables counter 602 to count is also connected to one input of OR gate 604 which receives another input through inverters 605 from the phase sense detector output. The output of OR gate 604 is connected through inverter 606 as one input of NAND gate 607 which combines the outputs of counter 602 for controlling the D input of D flip-flop 608. Flip-flop 608 is clocked by the $\overline{2F}$ clock signal for producing the MAX output signals. The $\overline{\text{MAX}}$ output is used to reset R-S flip-flop 609 which is set by the $\overline{\text{MIN}}$ output from D flip-flop 610 the D input of which is derived from OR gate 611 having one input connected from the output of the phase sense detector and the other input coming from the output of counter 602 indicating that the counter has reached its minimum.

As can be seen from the timing diagram shown in FIG. 10, the counter begins counting up when the phase sense signal goes high and will stop counting when it reaches its maximum count of 2F. It begins down counting the next time that the phase sense signal goes low. The maximum output signal is provided whenever the counter has attained a full count and the minimum output signal is generated whenever the counter has attained its minimum count of 0. The $\overline{\text{MAX}}$ and $\overline{\text{MIN}}$ signals are used to control R-S flip-flop 609 as shown with the $\overline{\text{MAX}}$ signal setting the R-S flip-flop and the $\overline{\text{MIN}}$ signal resetting it.

R-S flip-flop signal 609 controls the D input to D flip-flop 612 which is clocked by the $\overline{2F}$ clock signal. The outputs from R-S flip-flop 609 and D flip-flop 612 are combined by EXCLUSIVE OR 613 to provide the sync signal. Again as shown in FIG. 10, the D flip-flop output follows the R-S flip-flop output and the EXCLUSIVE OR gate will provide the pulses as shown. In this manner, the EXCLUSIVE OR gate 613 will reliably generate pulses on 1-0 bit sequences and will usually provide pulses on 1-1 bit sequences. As shown in FIG. 10, reliably generated pulses are shown in solid lines and the usually generated pulses are shown in dashed lines.

Figure 11:
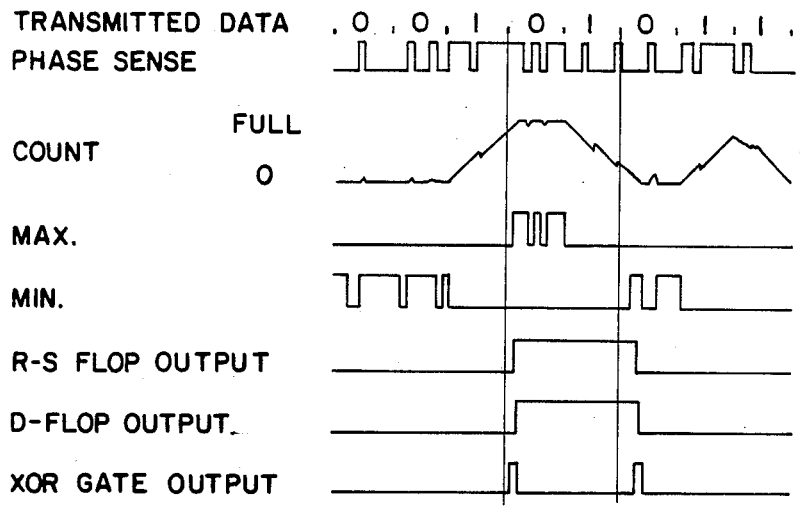
FIG. 11 shows the timing diagram of FIG. 10 but wherein the signals are subjected to noise.

In the presence of noise bursts, the count will not necessarily reach minimum or maximum levels at the end of each bit time. It may arrive late in the case of the 1-0 sequence and it may not arrive at all in the case of a 1-1 sequence. FIG. 11 shows the timing signal shown in FIG. 10 in the presence of noise. The pulses produced in the presence of noise as shown in FIG. 11 will still serve to resynchronize the data clock even though they may be late and infrequent.

Figure 12:
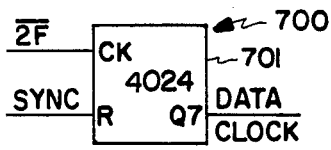
FIG. 12 shows the data clock of FIG. 1.

Data clock 700 is shown in more detail in FIG. 12. This data clock is a counter which counts the $\overline{2F}$ clock signal to produce an output pulse on its Q7 output terminal having a leading edge in the middle of a bit interval and a trailing edge at the end of each bit interval. Data clock 700 is periodically reset by the sync signal it receives from bit boundary detector 600. In this manner, the data clock is synchronized to the incoming data stream. The leading edge at the most significant output of the counter is used as the data clock since this leading edge should occur in the exact center of each bit time. The trailing edge should occur at the end of the bit time.

Figure 13:
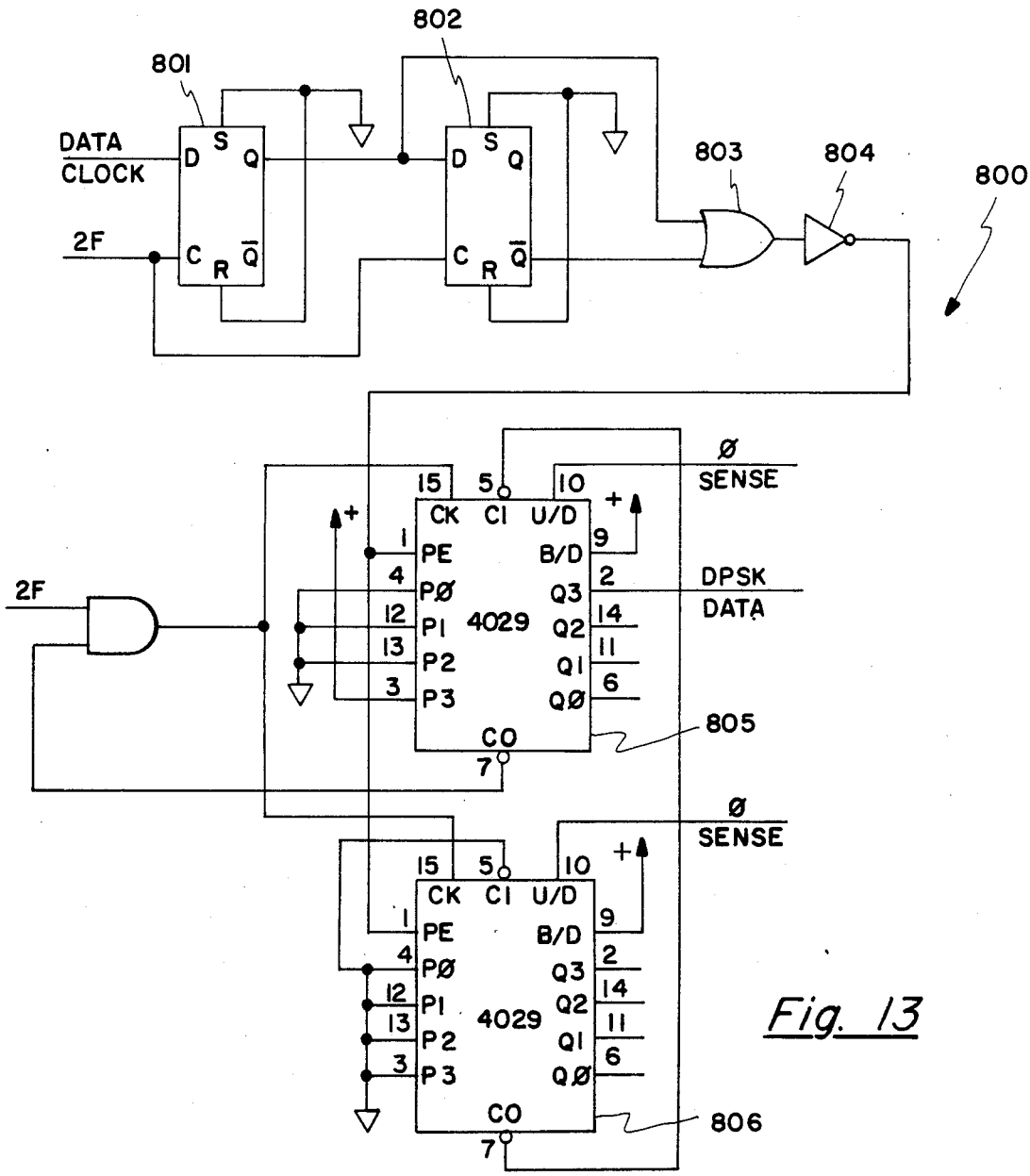
FIG. 13 shows the bit detector of FIG. 1.

This trailing edge is used to preset the digital integrator at the beginning of each bit time. The digital integrator is part of bit detector 800 shown in more detail in FIG. 13. The two D flip-flops 801 and 802 together with OR gate 803 and inverter 804 produce a narrow pulse one 2F clock cycle after each bit time starts. This pulse presets counter 805-806 to a count which is equal to half of its range.

The digital integrator is used to clean up noisy phase information. The phase sense signal again controls whether or not counter 805-806 counts up or down and the clock signals are again disconnected from the counter if the counter reaches its maximum or minimum counts. Counter 805-806 will count the 2F clock and provide an appropriate integrated bit at its output DPSK data.

Figure 14:
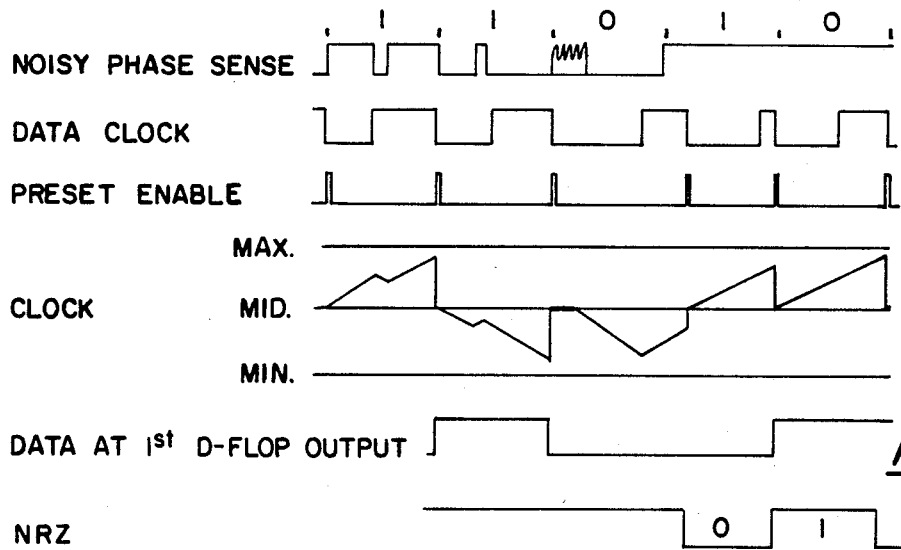
FIG. 14 shows a timing diagram of the signals associated with the bit detector of FIG. 13.

Thus, as shown in FIG. 14, the data clock output cycle is shown and provides the narrow pulses at the output of inverter 804 to preset counter 805-806 at its mid range. In the example shown the first 1 bit causes the counter to count up and integrate the first bit as received until it is again preset. If a 1 bit follows, the signal has been inverted again and the counter will count down on an average until it is again preset.

Figure 15:
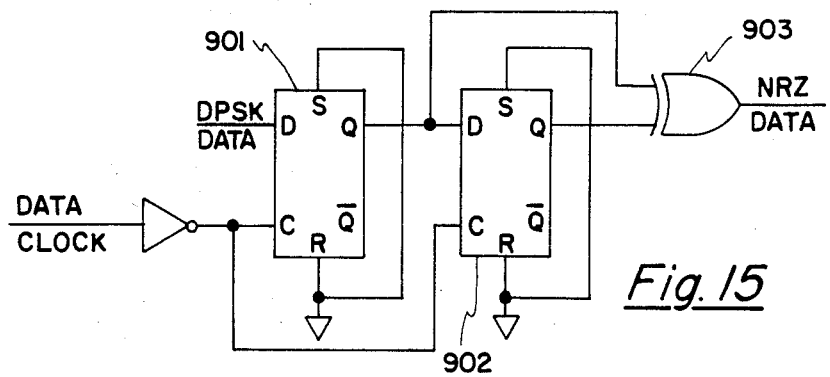
FIG. 15 shows the NRZ circuit of FIG. 1; and,
FIG. 16 shows the lock detector of FIG. 1.

The circuit of FIG. 15 will convert this DPSK data to nonreturn-to-zero (NRZ) data. The DPSK data is clocked through the first D flip-flop 901 at the end of the bit interval. Second flip-flop 902 and EXCLUSIVE OR gate 903 convert the DPSK data into NRZ data. Accordingly, if present data is the same as old data, the output from the converter is low. Conversely, if the present data is different from the old data, then the output from the converter goes high.

Figure 16:
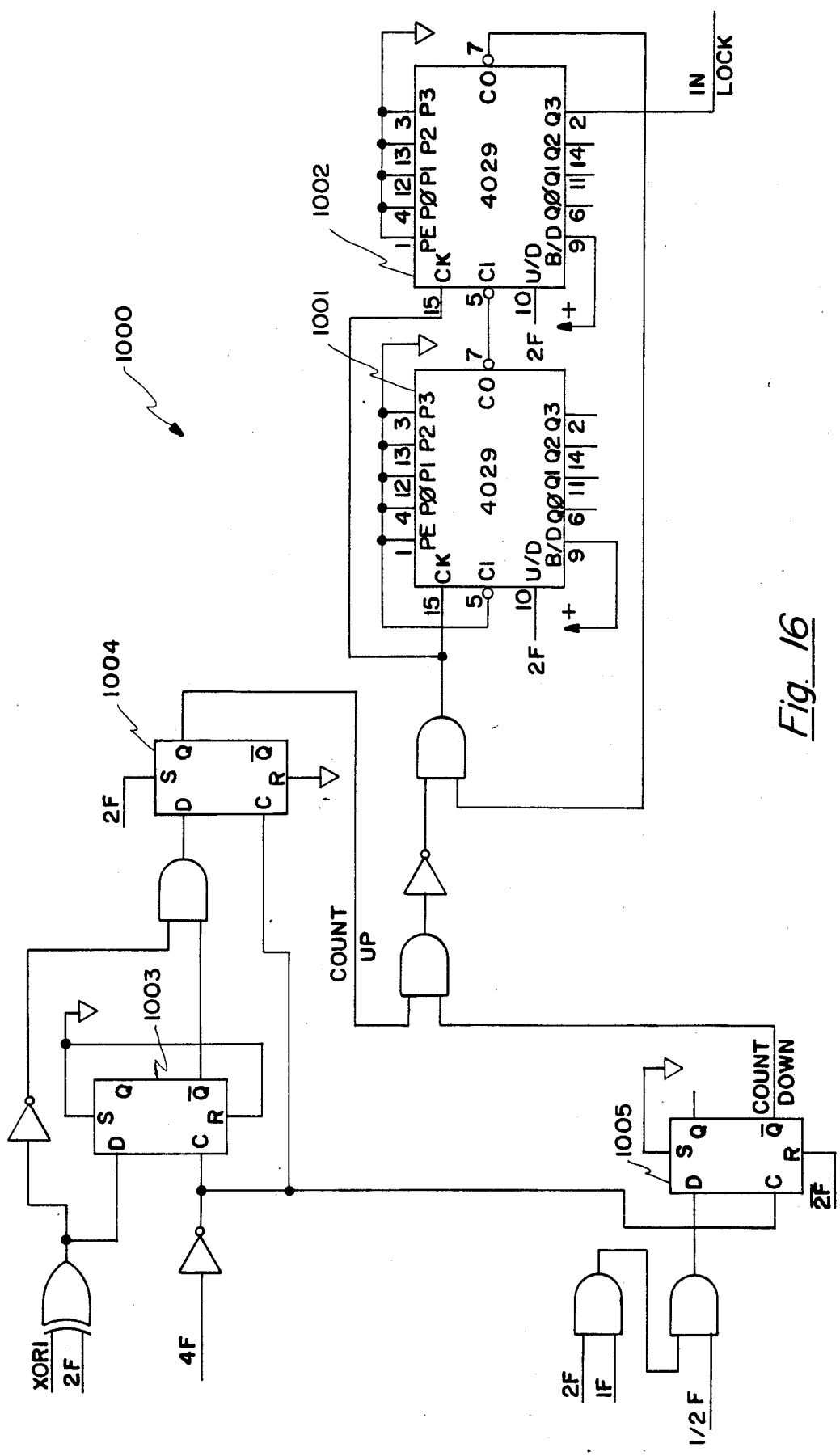

Finally, FIG. 16 shows lock detector 1000 in more detail. This circuit is again a counting type averager. Up/down counter 1001-1002, the range of which is limited by gates on its clock inputs, is used to determine how long the loop has been out of lock. A continuous input at half the carrier frequency conditions the counter to count down towards 0. A second circuit, sensitive to phase errors greater than plus or minus 45°, conditions the counter to count up at two times the carrier frequency. The count will, on the average, increase towards the full count of counter 1001-1002 if phase errors greater than 45° are present more than ¼ of the time. For an out-of-lock condition or missing carrier, phase errors are present half the time. The most significant output of the counter is used to indicate the in or out-of-lock condition for controlling gain switch 200.

In order to generate the count up signal, the signal X0R1, which is representative of the difference in phase between the carrier and the oscillator signal and which is driven to be identical to the 2F clock by the phase locked loop circuit, is EXCLUSIVE ORed with the 2F signal. Any discrepancy between these signals shows up as a 1 at the new EXCLUSIVE OR gate's output. When the input signal leads the 1F clock by 45° to 90°, it is necessary to store the fact that an error has occurred. D flip-flop 1003 stores this error and holds it for a 90° period. Second D flip-flop 1004 clocks in this error and resets 45° later. In this manner, error pulses, if present, will appear between count down pulses so they do not interfere with each other.

The count down signal is generated by D flip-flop 1005 which is clocked by the 4F signal. Because the direction that counter 1001-1002 counts is controlled by the 2F clock, and because the 2F clock is also used in order to synchronize the count up portion of the circuit and the count down portion of the circuit, the count up clock signals will be used to clock counter 1001-1002 during one half cycle of the 2F clock signal and the count down signal will be used to decrement the counter during the other half cycle of the 2F signal. Assuming that an error persists for the requisite amount of time, the in-lock signal will be provided for controlling gain switch 200 to change the loop time constant of the phase lock loop in order to speed up the response of the phase lock loop if the system is not locked up to the carrier.

If the circuit is locked up to a carrier, it should take a very large and long series of errors (caused by noise) in order to cause the local oscillator to drift any significant amount. If the circuit is not locked, the loop should be fast to allow rapid lock up. A delay of about two bit times may be chosen before changing the time constant. Most noise pulses will be gone by this time, or lock will be well under way.

The embodiments of the invention in which an exclusive property or right is claimed are defined as follows:

1. A receiver for demodulating differential phase shift keying data, said data having bit values dependent upon whether the phase of a carrier is inverted or not inverted during a bit interval, said receiver comprising:
   input means for receiving differential phase shift keying data;
   oscillator means for supplying an oscillator signal;
   phase detection means connected to said input means and to said oscillator means for providing a phase detection output signal dependent upon the difference in phase between said oscillator signal and said differential phase shift keying data;
   oscillator control means connected to said phase detection means and to said oscillator means for controlling the phase of said oscillator signal in response to said phase detection output signal;
   phase sense detection means connected to said input means and to said oscillator means for providing a phase sense output signal dependent upon the phase relationship between said differential phase shift keying data and said oscillator signal;
   data clock means connected to said oscillator means and to said phase sense detection means for providing a data clock signal defining a bit interval; and,
   bit detection means connected to said phase sense detection means, to said data clock means, and to said oscillator means for providing demodulated output data bits dependent upon said differential phase shift keying data.

2. The receiver of claim 1 wherein said phase detection means provides a phase detection output signal having a duty cycle dependent upon the difference in phase between said oscillator signal and said differential phase shift keying data.

3. The receiver of claim 2 wherein said phase detection means comprises a D flip-flop having a D terminal connected to receive said differential phase shift keying data, a clock terminal for receiving said oscillator signal and an output means for providing said phase detection output signal.

4. The receiver of claim 3 wherein said output means of said D flip-flop comprises an EXCLUSIVE OR gate having a first input connected to an output terminal of said D flip-flop and having a second input connected to receive said differential phase shift keying data.

5. The receiver of claim 4 wherein said oscillator means comprises a voltage controlled oscillator having an output frequency dependent upon a voltage input.

6. The receiver of claim 5 wherein said oscillator means comprises an integrator responsive to the duty cycle of said phase detection output signal for providing a voltage which is dependent upon the difference in phase between said oscillator signal and said differential phase shift keying data, said voltage from said integrator being connected as an input to said voltage controlled oscillator.

7. The receiver of claim 6 wherein said phase sense detection means provides a phase sense output signal having a first value when said differential phase shift keying data has the same phase as said oscillator signal and a second value when said differential phase shift keying data has a phase opposite to said oscillator signal.

8. The receiver of claim 7 wherein said data clock means comprises bit boundary detector means for providing sync pulses at the end of at least some bit intervals.

9. The receiver of claim 8 wherein said bit boundary detector means comprises an up/down counter for counting up when said phase sense output signal has one of its values and for counting down when said phase sense output signal has the other of its values.

10. The receiver of claim 9 wherein said data clock means comprises a bit interval counter having a clock terminal connected to receive said oscillator signal, a reset terminal connected to receive said sync signal and an output terminal for providing said data clock signal.

11. The receiver of claim 10 wherein said bit detection means comprises an up/down bit detection counter for counting said oscillator signal up when said phase sense output signal has one of its values and for counting said oscillator signal down when said phase sense output signal has the other of its values, said up/down bit detection counter providing integrated differential phase shift keying data at an output.

12. The receiver of claim 11 wherein said up/down bit detection counter receives an input from said data clock for presetting its count at the midpoint of its range.

13. The receiver of claim 12 wherein said bit detection means comprises an NRZ converter for converting said integrated differential phase shift keying data to NRZ data.

14. The receiver of claim 1 wherein said phase sense detection means provides a phase sense output signal having a first value when said differential phase shift keying data has the same phase as said oscillator signal and a second value when said differential phase shift keying data has a phase opposite to said oscillator signal.

15. The receiver of claim 14 wherein said data clock means comprises bit boundary detector means for providing sync pulses at the end of at least some bit intervals.

16. The receiver of claim 15 wherein said bit boundary detector means comprises an up/down counter for counting up when said phase sense output signal has one of its values and for counting down when said phase sense output signal has the other of its values.

17. The receiver of claim 16 wherein said data clock means comprises a bit interval counter having a clock terminal connected to receive said oscillator signal, a reset terminal connected to receive said sync signal and an output terminal for providing said data clock signal.

18. The receiver of claim 17 wherein said bit detection means comprises an up/down bit detection counter for counting said oscillator signal up when said phase sense output signal has one of its values and for counting said oscillator signal down when said phase sense output signal has the other of its values, said up/down bit detection counter providing integrated differential phase shift keying data at an output.

19. The receiver of claim 18 wherein said up/down bit detection counter receives an input from said data clock for presetting its count at the midpoint of its range.

20. The receiver of claim 19 wherein said bit detection means comprises an NRZ converter for converting said integrated differential phase shift keying data to NRZ data.

21. The receiver of claim 1 wherein said bit detection means comprises an up/down bit detection counter for counting said oscillator signal in one direction when said carrier is inverted and for counting said oscillator signal in the other direction when said carrier is not inverted, said up/down bit detection counter providing integrated differential phase shift keying data at an output.

22. The receiver of claim 21 wherein said up/down bit detection counter receives an input from said data clock for presetting its count at the midpoint of its range.

23. The receiver of claim 21 wherein said data clock means comprises bit boundary detector means for providing sync pulses at the end of at least some bit intervals.

24. The receiver of claim 23 wherein said bit boundary detector means comprises an up/down counter for counting in one direction when said carrier is inverted and for counting in the other direction when said carrier is not inverted.

25. The receiver of claim 1 wherein said oscillator means comprises gain changing switch means responsive to said oscillator signal and to said phase detection output signal for providing a long time constant when said loop is in-lock and providing a short time constant when said loop is out-of-lock.

26. The receiver of claim 25 wherein said gain changing switch means comprises up/down lock counter means for counting in one direction when said loop is out-of-lock and for counting in the other direction when said loop is in-lock.

27. A receiver for demodulating differential phase shift keying data, said data having bit values dependent upon whether the phase of a carrier is inverted or not inverted during a bit interval, said receiver comprising:
  input means for receiving differential phase shift keying data;
  voltage controlled oscillator means for supplying an oscillator signal;
  digital phase detection means connected to said input means and to said voltage controlled oscillator means for providing a phase detection output signal having a duty cycle dependent upon the difference in phase between said oscillator signal and said differential phase shift keying data;
  oscillator control means connected to said phase detection means and to said voltage controlled oscillator means for integrating said phase detection output signal into a voltage having a value dependent upon said duty cycle, said voltage being supplied to said oscillator means for locking said oscillator signal to said differential phase shift keying data;
  digital phase sense detection means connected to said input means and to said voltage controlled oscillator means for providing a phase sense output signal dependent upon the phase relationship between said differential phase shift keying data and said oscillator signal;
  digital bit boundary detection means connected to said voltage controlled oscillator means and to said phase sense detection means for supplying sync signals at the end of at least some bit intervals;
  digital data clock means connected to said voltage controlled oscillator means and to said bit boundary detection means for providing a data clock signal; and,
  digital bit detection means connected to said phase sense detection means, to said data clock means, and to said voltage controlled oscillator means for providing demodulated output data bits dependent upon said differential phase shift keying data.

28. The receiver of claim 27 wherein said bit detection means includes an up/down bit detection counter for counting said oscillator signal in a first direction when said carrier has been inverted and for counting said oscillator signal in a second direction when said phase of said carrier has not been inverted, said up/down bit detection counter integrating said differential phase shift keying data to produce integrated differential phase shift keying data to thereby reject noise.

29. The receiver of claim 28 wherein said bit boundary detector means comprises an up/down counter for counting said oscillator signal in a first direction when said phase of said carrier has been inverted and for counting said oscillator signal in a second direction when said phase of said carrier has not been inverted.

30. The receiver of claim 29 wherein said oscillator means comprises gain changing switch means responsive to said oscillator signal and to said phase detection output signal for providing a long time constant when said loop is in-lock and providing a short time constant when said loop is out-of-lock.

31. The receiver of claim 30 wherein said gain changing switch means comprises up/down lock counter means for counting in a first direction when said loop is out-of-lock and for counting in a second direction when said loop is in-lock.

* * * * *